June 20, 1961  C. H. HELBING  2,989,422
METHOD AND APPARATUS FOR COATING A FIBROUS BASE
Filed Aug. 30, 1957
FIG. 1
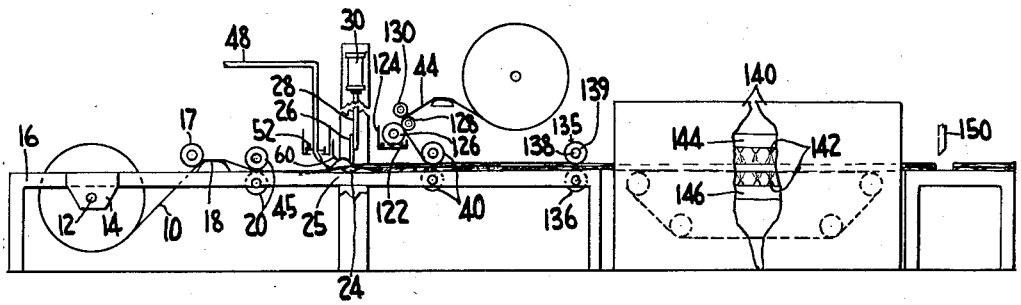
FIG. 2
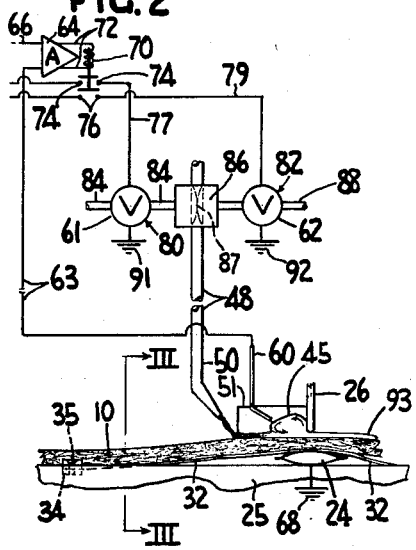
FIG. 5
FIG. 3
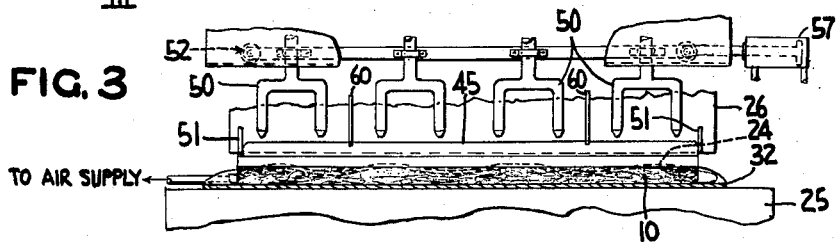
TO AIR SUPPLY
FIG. 4
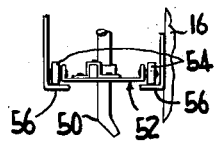
INVENTOR.
CLARENCE H. HELBING
BY
Oscar H. Spencer
ATTORNEY

United States Patent Office 2,989,422
Patented June 20, 1961

2,989,422
METHOD AND APPARATUS FOR COATING
A FIBROUS BASE
Clarence H. Helbing, Shelbyville, Ind., assignor to Pittsburgh Plate Glass Company, Allegheny County, Pa., a corporation of Pennsylvania
Filed Aug. 30, 1957, Ser. No. 681,362
9 Claims. (Cl. 117—111)

The present invention relates to a method and an apparatus for doctoring a viscous, flowable composition onto the surface of a compressible, porous, fibrous blanket and it has particular relation to a method and an apparatus for applying an aqueous slurry of the composition of uniform thickness on a surface of a glass fiber blanket.

Glass fiber blankets surfaced with various coatings such as synthetic latices have many uses. It is desired that these coatings be of uniform thickness and do not penetrate to any appreciable extent into the blanket. Accomplishment of this may be aided if the viscosity of the latex or other material is increased by the addition of viscosity controlling agents such as methyl cellulose and the like.

It is known that an article composed of a plurality of fibrous blankets having a continuous, heavy, dense interlayer is useful for sound absorbing and sound deadening. This article can be made by spreading a viscous slurry of the interlayer composition over one blanket with a doctor blade so as to produce a layer thereon of uniform thickness slightly impregnating the blanket. Another blanket is then placed over and laminated with the interlayer composition so that a sandwich-like article is produced. The article is then dried.

The interlayer composition is prepared in the form of a viscous aqueous slurry having a viscosity of about 90,000 to 160,000 centipoises as measured by a Brookfield viscosimeter, Model No. RVF, employing number 6 spindle rotating at 2 r.p.m. A typical slurry formulation is as follows:

| Ingredient: | Amount |
|---|---|
| Sand _____pounds__ | 7200 |
| Aqueous emulsion of butadiene-styrene latex (48% by weight solids) _____pounds__ | 947 |
| Tetra sodium pyrophosphate _____do____ | 3.9 |
| 1% aqueous solution of carboxymethyl cellulose (high viscosity) _____pounds__ | 36.2 |
| Dowicide A (sodium salt of ortho phenyl phenol) _____grams__ | 84 |
| Wetting agent (polyoxyethylated nonyl phenol) _____pounds__ | 64.6 |
| Asbetsos fiber _____do____ | 720 |
| Carbon black _____do____ | 6.7 |
| Vultex X–V–6–C PRTB (acetone-diphenyl amine condenseate) _____pounds__ | 7.0 |
| Water _____gallons__ | 284.5 |

It is desired that the interlayer be of uniform thickness so that it can be completely and evenly dried as it passes through a drying oven. If portions of the layer are too thick, they are not sufficiently dried. The moisture in these portions causes the fibers to become weak and the fibrous blanket collapses and is unsatisfactory for its use as a sound absorber and sound deadener. If there are portions of the interlayer which are too thin, they are burned during the drying operation and give off undesirable odors, thereby making working conditions extremely unpleasant. Thus, it is desired that a method of doctoring the slurry on the fibrous blanket be provided which produces a layer of uniform thickness on the fibrous blanket.

One of the problems encountered in doctoring an even coating on a fibrous blanket is the variation in thickness or resilience of the fibrous blanket. Glass fiber blankets are manufactured by subjecting a plurality of rods of glass to the blast from a burner such as shown in U.S. Patents Nos. 2,489,242 and 2,489,243 to attenuate the rods into fine fibers which are collected on a conveyer in blanket form. A coating of a thermosetting binder such as phenol formaldehyde is applied to the fibers as they pass through the air and/or are deposited on a conveyer in blanket form. This blanket is then heated to cause the resin to cure and bind the fibers to each other in the form of a porous, resilient, low density blanket. The density of the blanket for acoustical purposes may be about 0.5 to 5 pounds per cubic foot and the thickness may be about ⅛ to 2 inches. The individual fibers are about 0.5 to 6 microns in diameter and vary in length from less than about 1 inch to 10 or more inches. The fibers are arranged haphazardly with respect to each other and bound in such relationship by about 15 to 40 percent by weight of binder based upon the weight of the glass.

In this method of manufacture it is possible that the fibrous blanket may have portions which are more or less resistant to compression than the blanket as a whole. The differences in compressibility may be caused by differences in thickness, density, binder content or other reasons. For example, streamers or clumps of fibers may accumulate on the walls of the chamber in which the fibers are formed. When they become too heavy, they drop onto the conveyer and provide a portion in the blanket which is of higher density or greater thickness than the average density or thickness of the blanket. The binder content in these areas is greater than other areas and thus these areas of the blanket resist compression more than other areas. It is also possible that some areas in the blanket may be starved and thinner than the average thickness of the blanket due to variations in the forming procedure.

It can be seen that as these non-uniform portions of the blanket pass under or across a doctor blade in the slurry coating operation, they exert uneven and varying pressures on the slurry between the blade and the surface of the blanket. This results in the formation of a slurry layer of varying thickness. The variation in pressure exerted by the blanket on the slurry permits differing amounts of slurry to pass under the doctor blade and be applied to the surface of the mat. It is therefore an object of the invention to provide a method and apparatus by which a layer of slurry of uniform thickness may be applied continuously to a compressible glass fiber blanket and in particular to a blanket which contains the above-described variations.

A further object of the invention is to provide means whereby the pressure exerted on the slurry between the doctor blade and the fibrous mat is maintained constant during the coating operation. It is also desired to provide means whereby the supply of slurry directly in front of the doctor blade is maintained continuously at a fixed amount.

Another object of the invention is to provide means whereby the fibrous blanket is supported in such a way that the sum of the forces exerted against the slurry by the blanket and its support is constant, thereby permitting a constant force against the slurry and doctor blade.

Another object of the invention is to provide a support for the fibrous blanket during the coating operation which will exert a constant pressure on the blanket but will vary as to its position relative to the doctor blade, thereby permitting varying compressed thicknesses of blanket mat to pass between the support and the doctor blade and receive a coating of uniform thickness.

Another object of the invention is the provision of supporting means opposed to the doctor blade along its length which permits various thicknesses of compressed blanket to pass between the doctor blade and supporting means at different points along the length of the doctor blade at the same time so as to exert a uniform and constant pressure against the slurry at all points along the length of the doctor blade.

These and other objects of the invention may be accomplished by maintaining a fixed amount of slurry before the doctor blade. They may be further accomplished by the use of an inflated bladder as a support for the mat as it passes the doctor blade. The invention is further described in conjunction with the drawing in which:

FIG. 1 is a diagrammatic elevation of apparatus suitable for making a sound absorbing and deadening article in accordance with the present invention;

FIG. 2 is an enlarged portion of FIG. 1 diagrammatically illustrating the portion of the apparatus employed for applying the slurry coating to the blanket and maintaining a constant amount of slurry before the doctor blade;

FIG. 3 is a cross section of the portion of the apparatus shown in FIG. 2 as taken along lines III—III of FIG. 2;

FIG. 4 is a side view of a portion of the apparatus shown in FIG. 3 illustrating the oscillation of the slurry supply means; and FIG. 5 is a diagrammatic view of a pneumatic system employed in combination with the bladder of the present invention.

In the drawing, a blanket 10 of glass fibers is shown as supplied from a roll wrapped around a tube 12 positioned in bearings 14 mounted on framework 16. The blanket 10 passes under roller 17 and over friction bar 18 and then between a pair of guide rollers 20 mounted on the framework 16 on its way to the coating apparatus.

The coating operation is shown in greater detail in FIGS. 2 and 3. A bladder 24 made of polyethylene or other flexible, air impermeable sheet material rests on table 25 which is part of the general supporting framework 16. The bladder may be taped or otherwise held in position on the table 25 directly beneath a doctor blade 26 which is rigidly mounted on the end of a piston 28 movable in cylinder 30 which is attached to the framework 16. The doctor blade may be raised or lowered to a fixed position by movement of the piston in the cylinder to adjust the distance between it and the bladder 24.

The bladder 24 and doctor blade 26 extend across the table so as to cover the full width of the blanket 10. For example, if the blanket is 72 inches wide, the doctor blade may be 78 inches in length and the bladder 80 inches in length and centered underneath the doctor blade. The bladder is two inches in width when deflated so as to present a tube under the doctor blade having a circumference of 4 inches when fully inflated. As shown in FIG. 2, the bladder is not fully inflated and this is the usual practice. The bladder may be formed of two sheets of polyethylene which are heat sealed around an area measuring 80 inches by 2 inches with flange portions extending outwardly therefrom on all sides to permit the bladder to be taped or otherwise adhered to the table 25. It is also contemplated that the bladder may be in the form of an inflated roll.

The bladder 24 is covered by glass cloth 32 impregnated with Teflon (polytetrafluoroethylene) or other substance which will make the glass cloth as tough and slippery as possible so as to permit the fibrous blanket 10 to slide over it with minimum friction and wear. The cloth acts as a protective covering for the bladder. The bladder may be made of a tough, slippery air impermeable substance and the protective cloth may not be required. The cloth 32 is fastened to the framework 16 at 34 by means of bolts 35 passing through the framework.

The glass fiber blanket 10 is pulled through the opening between the doctor blade 26 and bladder 24 by means of pinch rollers 40. The spacing of the rollers from each other is such that the blanket having the coating thereon and another fibrous blanket 44 adhered thereto are squeezed together to obtain a good grip thereon and advance the sandwich-like assembly.

A viscous slurry of the interlayer composition 45 is supplied to the top surface of blanket 10 just prior to the passage of the blanket by the doctor blade 26. This slurry is pumped from a supply through conduit 48 into a system of delivery lines 50 which branch out so as to provide numerous sources of slurry supply across the mat. Slurry retainer plates 51 are mounted on the framework 16 on both sides of the doctor blade to contain the slurry at the edges of the blanket. This system tends to maintain a uniform supply of the slurry between the retainer plates in front of the doctor blade across its complete width. The lines 50 are mounted on a carriage 52 having wheels 54 running on trackways 56 rigidly mounted on the framework 16 (FIG. 4). A conventional piston and cylinder mechanism 57 moves the distribution system back and forth above the blanket transverse to the direction of movement of the blanket so as to deposit a uniform supply of slurry on the top surface of blanket 10.

The slurry 45 is shown in FIG. 2 in the form of a rotating mass in front of the doctor blade with the slurry which does not pass underneath the doctor blade onto the blanket moving upwardly along the surface of the doctor blade and then away from it and down towards the mat, thereby creating a revolving motion to this supply of slurry. The amount of slurry in front of the doctor blade is controlled by means of a probe 60 connected to an electrical system which activates and deactivates valves 61 and 62 permitting the slurry to flow through the distribution conduit 48.

The electrical system is diagrammatically shown in FIG. 2. The probe 60 is connected by line 63 to amplifier 64 which is connected to a source of potential through line 66. When the probe is in contact with the slurry 45, a circuit is completed and current flows through line 66, amplifier 64, line 63, probe 60, slurry 45 and framework 16 to ground 68. This flow of current through amplifier 64 actuates relay 70 connected to the amplifier through lines 72 and causes the relay to close with contacts 74 and 76 in lines 77 and 79 respectively. Lines 77 and 79 are connected to sources of potential and to solenoid valves 80 and 82 respectively.

Solenoid valve 80 is positioned in air line 84 connected to a source of high pressure air (50 pounds per square inch) and is normally closed. Line 84 passes into a chamber 86 which has flexible, compressible supply conduit 87 passing through it. Solenoid valve 82 is connected to discharge air line 88 from chamber 86 and is normally open. Thus, when the probe 60 is not in contact with the slurry 45, relay 70 is not actuated, solenoid valve 80 remains closed, no air pressure is exerted on conduit 87 and the slurry is forced through conduit 48 by suitable pumping means (not shown).

When the probe 60 is in contact with the slurry 45, the relay 70 is actuated to close contacts 74 and 76 in lines 77 and 79 respectively to permit current to flow through lines 77 and 79 to solenoid valves 61 and 62 respectively and to grounds 91 and 92 respectively. Normally closed valve 61 is opened and normally open valve 62 is closed. This permits air under pressure to pass through air line 84 into chamber 86 and collapse supply conduit 87, thereby stopping the flow of slurry.

The supply of the slurry rotating in front of the doctor blade should be substantially constant in order that the pressure exerted on the glass fiber blanket as it passes under the doctor blade be substantially constant. The fibrous blanket 10 is compressed somewhat as it passes underneath the doctor blade. The weight and viscosity of the slurry help to determine the amount of compression of the blanket. The greater the viscosity of the slurry, the more the blanket is compressed. The bladder 24 acts as a support pressing upwardly against the blanket as it passes the doctor blade so that the upper surface of the blanket is maintained at a constant distance from the doctor blade. This allows a layer 93 of uniform thickness to pass between the doctor blade and blanket and deposit on the upper surface of the blanket. The pressure which is maintained in the bladder is dependent on the viscosity of the slurry and will be greater as the viscosity of the slurry is greater.

A sample set of conditions may serve to further illustrate the manner of operation of the invention. A blanket of glass fibers having a density of about 0.7 pound per cubic foot and a thickness of about 5/16 inch is passed under the doctor blade. The distance between the doctor blade and the cloth 32 when the bladder is completely deflated is 5/8 of an inch. The bladder is filled with air at a pressure of 5 to 12 inches of water and is expanded so that its height is approximately 30/64 of an inch. An interlayer 93 of slurry having a viscosity between 90,000 and 160,000 centipoises is applied to the mat, said layer having a height of about 1/32 inch and a weight of about 2.5 ounces per square foot. The dimensions of the slurry bank which is maintained against the doctor blade may be 1½ inches in height, 3¾ inches in front of the blade and 74 inches across the blade. This gives a weight of about 20 pounds of slurry bank pressing down on the blanket. The air pressure which is maintained constantly in the bladder varies as the viscosity of the slurry which is being applied to the blanket. As the blanket 10 passes underneath the doctor blade, it is compressed to a thickness of approximately 1/8 inch by the forces of the slurry and doctor blade from above and the bladder from below.

These conditions will be maintained constant during the coating operation as long as the characteristics of the blanket are uniform and remain the same. As soon as any portion of the blanket resists this compression and attempts to pass under the doctor blade at a greater thickness, the bladder under this portion will deflate and allow the portion of the blanket of increased thickness to pass underneath the blade while still maintaining a constant, uniform force or pressure upon the slurry. The pressure within the bladder is maintained the same, however, the volume is decreased. This maintenance of a constant pressure at the interface between the blanket and the slurry permits a uniform thickness of slurry to pass between the blade and blanket and deposit on the surface of the blanket.

The bladder operates in an opposite manner when a portion of the blanket 10, which is less than the average thickness of the blanket, passes underneath the blade. In this instance, the bladder maintains the same pressure but expands vertically toward the doctor blade so as to maintain the upper surface of the blanket at a fixed distance from the doctor blade and exert a constant pressure against the slurry. A good illustration of the action of the bladder may be seen in FIG. 3 where the bladder is shown to be inflated to different heights across the width of the table 25. The maintenance of a constant pressure in the bladder permits a constant pressure to be applied by the blanket 10 to the slurry at all times as the blanket and slurry pass underneath the doctor blade.

In FIG. 5 the pneumatic system for the bladder 24 is shown. Air at approximately 90 pounds per square inch is supplied through line 95 to a reducing valve 97 which supplies air to line 98 at a pressure of about 5 pounds per square inch. Air in line 98 passes through valve 100 and line 102 to the bladder 24. A bleed portion of the air from line 98 passes through valve 104 and line 105 into a bubble tube 106 with the outlet of the line 105 being at a fixed predetermined distance below the surface of the water in the tube.

The height of the water above the outlet determines the pressure of the air in line 108 which feeds into the upper chamber 110 enclosed by diaphragm housing 111. The lower chamber 112 enclosed by the housing 111 is connected to line 102 through line 114. The chambers 110 and 112 are separated by a diaphragm 115 which actuates valve 100. As long as the pressures in the chambers 110 and 112 are the same, the diaphragm 115 remains constant in position and holds the valve 100 partially open so that a small flow of air passes from line 98 through lines 102 and 118 and out through valve 120. The valve 120 is set to permit a gentle flow of air which is detectable by hand to escape from the system. When the volume within the bladder 24 expands, the pressure in lines 102 and 114 and in chamber 112 is reduced and the diaphragm 115 moves downwardly. This opens the valve 100 further and air moves into the bladder until the predetermined pressure is obtained in the bladder, lines 102 and 111, and chamber 112. When the predetermined pressure is obtained in chamber 112, the diaphragm 115 is raised and valve 100 is returned to its partially open condition.

When the bladder is compressed, the air within it moves out through line 118 and lines 102 and 114 to momentarily increase the pressure in chamber 112. This further closes the partially open valve 100 and the air in the bladder 24 passes out through line 118 and valve 120, to the atmosphere. Thus, an automatic means employing principles of dynamic balance for maintaining the air within the bladder at constant pressure with variations in volume of the bladder is achieved. If the viscosity of the slurry is found to change, then the pressure in the bladder may be changed by changing the position of the outlet of line 105 in the bubble tube 106.

After the blanket 10 has been coated with the uniform thickness layer 93 of slurry, it passes between rollers 40. Just prior to its entry between the rollers 40, a blanket of fibers 44 which is similar to or the same as blanket 10 is laid on top of and adhered to the slurry coating. The pressure of the rollers 40 causes the layer 10 to adhere to the coating, thereby forming a sandwich.

As an additional precaution, a layer of adhesive 122 may be applied to the surface of the blanket 44 which contacts the slurry coating. The adhesive 122 is maintained in a reservoir 124 and applied to the blanket by means of a roller 126 rotating in the adhesive. The blanket 44 is held against the roller 126 by means of roller 128. A roller 130 is mounted adjacent roller 126 to insure that an even supply of adhesive is deposited on the surface of the roller 126 for application to the blanket 44. The adhesive may be any rubber containing adhesive such as an aqueous dispersion of a copolymer of butadiene-styrene having a suitable amount of carboxymethyl cellulose incorporated therein to provide the copolymer with the proper viscosity for application to the blanket.

The sandwich composed of the blankets 44 and 10 and interlayer 93 next passes between rollers 135 and 136. Roller 136 is a solid, unyielding roller made of a material such as stainless steel. Roller 135 is composed of a cylindrical core 138 having mounted thereon a very yieldable covering 139 such as sponge rubber of approximately 1 inch or more in thickness. Rollers 135 and 136 are spaced quite closely together and press the blankets 10 and 44 and interlayer 93 together to insure that they are properly laminated and adhere to each other. The sandwich-like article then passes through drying oven 140 where jets of hot air issuing through slots 142 in chambers 144 and 146 located above and below the article respectively remove the moisture from the interlayer. The article is severed into proper lengths by chopper 150 after it emerges from the oven.

The use of the method and apparatus of the present invention has permitted the application of a coating of a viscous, flowable composition to a compressible, fibrous blanket in such a manner that a coating of uniform thickness is obtained at all times throughout the operation. Although the present invention has been described with reference to specific details of certain embodiments thereof, these details are not to be considered as limitations upon the scope of the invention except as set forth in the accompanying claims.

I claim:

1. A method of applying a coating of a flowable, viscous composition to a compressible base of non-uniform thickness by means of a doctor blade which comprises supplying a quantity of the composition to a surface of the base, moving the base and composition thereon into contact with the doctor blade so as to spread the coating on the surface of the base and supporting the base on the side opposite the doctor blade by means of a flexible, resilient, pneumatic support maintained at constant pressure against the base so as to maintain the distance between the base and the doctor blade substantially constant, individual portions of said support along the length of the support opposite the doctor blade being separately movable toward and away from the doctor blade in response to differences in thickness of the base across its width and along its length as portions of the base of varying thickness pass across the doctor blade.

2. A method of applying a coating of uniform thickness of a viscous, flowable composition on a compressible fibrous blanket by means of a doctor blade which comprises moving the fibrous blanket in the direction of its length past a doctor blade, supplying a quantity of the composition to the surface of the blanket prior to the point of its travel past the doctor blade and supporting the blanket and composition thereon as they pass in contact with the doctor blade by a resilient, flexible, hollow support located opposite the doctor blade maintained at constant pressure against the blanket as portions of the blanket of varying compressibility pass between the blade and the support by varying the volume of the support in response to variations in the thickness of the base across its width and along its length.

3. A method of applying a coating of a flowable, viscous composition to a compressible base of non-uniform thickness by means of a doctor blade which comprises supplying a quantity of the composition to a surface of the base, moving the base and composition thereon into contact with the doctor blade so as to spread the coating on the surface of the base and supporting the base on the side opposite the doctor blade by means of a flexible, resilient, hollow, pneumatic support maintained at constant pressure against the base so as to maintain the distance between the base and the doctor blade substantially constant as portions of the base of varying thickness pass across the doctor blade, the support being maintained at constant pressure by continuously removing and supplying a quantity of gas to the support in response to variations in thickness of the coated base passing the doctor blade.

4. An apparatus for coating a compressible base with a viscous, flowable composition which comprises a doctor blade, means for moving the base past the doctor blade, means for supplying the composition to the base prior to its movement past the doctor blade, a flexible, resilient, hollow support means positioned on the side of the base opposite from the doctor blade, individual portions of said support means along the length of the support opposite the doctor blade being separately moveable toward and away from the doctor blade in response to differences in thickness of the base across its width and along its length and means for automatically varying the volume of the hollow support means by supplying a gas or withdrawing a gas from the interior of the hollow support means in response to the variations in the thickness of the coated base as it passes across the doctor blade so as to maintain the pressure exerted by the support against the base constant.

5. An apparatus for coating a compressible base with a viscous, flowable composition which comprises a doctor blade, means for moving the base past the doctor blade, means for supplying a quantity of the composition to the base prior to its movement past the doctor blade, a bladder mounted on the opposite side of the base from the doctor blade to support the base as it passes by the doctor blade and means for automatically supplying a gas to and withdrawing a gas from the interior of the bladder in response to variations in thickness of the coated base so as to vary the volume of gas within the bladder and maintain the pressure exerted by the bladder against the base constant as the coated base moves past the doctor blade.

6. An apparatus for coating a compressible base with a viscous, flowable composition which comprises a doctor blade, means for moving the base past the doctor blade, means for supplying a quantity of the composition to the base prior to its movement past the doctor blade, means for maintaining the supply of composition on the base prior to the doctor blade substantially constant, a bladder mounted on the opposite side of the base from the doctor blade to support the base as it passes by the doctor blade and means for automatically supplying a gas to and withdrawing a gas from the interior of the bladder in response to variations in thickness of the coated base so as to vary the volume of gas within the bladder and maintain the pressure exerted by the bladder against the base constant as the coated base moves past the doctor blade.

7. An apparatus for applying a coating of a viscous, flowable composition to a compressible glass fiber blanket at least ⅛ inch in thickness which comprises a doctor blade, means for moving the blanket past the doctor blade, means for supplying a quantity of the composition to the top surface of the blanket prior to its movement past the doctor blade, means for controlling the supply means so as to maintain a supply of the composition of substantially constant dimensions and constant weight on the blanket in front of and in contact with the doctor blade, an inflated, hollow, resilient member mounted on the opposite side of the blanket from the doctor blade to support the blanket as it passes by the doctor blade and means for automatically supplying a gas to and withdrawing a gas from the interior of the member in response to variations in thickness of the blanket so as to vary the volume of gas within the bladder and maintain the pressure exerted by the member against the blanket constant as the coated blanket moves past the doctor blade.

8. An apparatus for applying a coating of a viscous, flowable composition to a compressible, fibrous blanket at least ⅛ inch in thickness which comprises a doctor blade, means for moving the blanket past the doctor blade, means for supplying a quantity of the composition to the top surface of the blanket, means for oscillating the supply means back and forth across the blanket transversely to the direction of movement of the blanket and parallel to the length of the doctor blade and means for controlling the supply means so as to maintain a supply of the composition of substantially constant dimensions and constant weight on the blanket in front of and in contact with the doctor blade, said supply being in excess of that minimum amount of coating composition which is required to maintain a continuous coating operation.

9. An apparatus for applying a coating of a viscous, flowable composition to a compressible, fibrous blanket at least ⅛ inch in thickness which comprises a doctor blade, means for moving the blanket past the doctor blade, means for supplying a quantity of the composition to the top surface of the blanket, means for oscillating the supply means back and forth across the blanket transversely to the direction of movement of the blanket and parallel to the length of the doctor blade, means for controlling the supply means so as to maintain a supply of the composition of substantially constant dimensions and constant weight on the blanket in front of and in contact with the doctor blade, an inflated, hollow, resilient member mounted on the opposite side of the base from the doctor blade to support the blanket as it passes by the doctor blade and means for supplying a gas to and withdrawing a gas from the interior of the member so as to maintain the pressure exerted by the member against the blanket constant.

References Cited in the file of this patent

UNITED STATES PATENTS

| | | |
|---|---|---|
| 1,799,002 | Case | Mar. 31, 1931 |
| 1,956,561 | Coates | May 1, 1934 |
| 2,195,101 | Swab | Mar. 26, 1940 |
| 2,227,530 | Binns | Jan. 7, 1941 |
| 2,423,555 | Ender | July 8, 1947 |
| 2,489,243 | Stalego | Nov. 22, 1949 |
| 2,583,267 | Jones et al. | Jan. 22, 1952 |